UNITED STATES PATENT OFFICE 2,628,963

1,4-DIAMINO-2,3-ANTHRAQUINONE-DICARBOXIMIDES

Joseph F. Laucius and Stanley B. Speck, Wilmington, Del., assignors to E. I. du Pont de Nemours & Company, Wilmington, Del., a corporation of Delaware No Drawing. Application December 5, 1951, Serial No. 260,086

6 Claims. (Cl. 260—326)

This invention relates to the preparation of new compounds, and more particularly 1,4-diamino - 2,3 - anthraquinone - dicarboximides which are useful as dyes, especially for the new polyethylene terephthalate fiber now known as "Dacron" fiber.

In the Jr. Society of Dyers and Colourists, 1946, page 348, it is pointed out that the discovery of dyes which are suitable for the coloring of the new polyethylene terephthalate fiber, and the methods for applying these dyes, has presented a real problem. This has been further discussed in an article in the American Dyestuff Reporter, 1948, page 699. The finding of satisfactory blue dyes for all types of fibers has presented a peculiar problem, that is, where affinity, light-fastness and other fastness properties are of particular importance, and in the dyeing of the new polyethylene terephthalate fibers the finding of a blue dye which has sufficient affinity for this fiber and yet will exhibit the necessary fastness properties is still a problem. This is more particularly discussed in the American Dyestuff Reporter, 1951, page 54, wherein the new fiber is designated as "Fiber V."

This invention has for its object to produce new compounds of the anthraquinone series that are suitable for the coloring of new polyethylene terephthalate fibers known as "Dacron." A more specific object of the invention is to prepare 1,4-diamino-2,3-anthraquinone - dicarboximides which are useful in the dyeing of the new fiber "Dacron" in blue shades when used as individual compounds, or more particularly as mixtures.

The new compounds of this invention have the general formula:

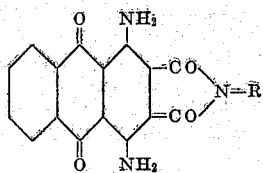

in which R stands for a radical of the group consisting of -H, -alkyl, hydroxyalkyl-, cycloalkyl- and aralkyl-, all of which alkyl and substituted alkyl contain not more than 7 carbon atoms.

The compounds of this invention may be prepared by different methods. For instance, the 1,4 - diamino - 2,3 - anthraquinone - dicarboxamides (such as disclosed in co-pending application Serial No. 260,085 OR-2183) may be heated in 96% sulfuric acid at temperatures of from 75° to 80° C., then after cooling to a lower temperature water is slowly added and as the solution is cooled crystals separate out which are filtered off. These may be washed in hot water, which converts them from an orange to a blue color. The compounds may likewise be prepared from the 1,4-diamino-2,3-anthraquinone-dicarbonitriles by heating in concentrated sulfuric acid with the addition of a secondary alcohol, or when the straight 1,4-diamino-2,3-anthraquinone-dicarboximide is to be produced, the alcohol is omitted.

The following examples are given to illustrate the invention. The parts used are by weight.

Example 1

Two procedures for the preparation of 1,4-diamino-2,3-anthraquinone - dicarboximide are described below in parts a and b.

a. From the corresponding amide as follows:

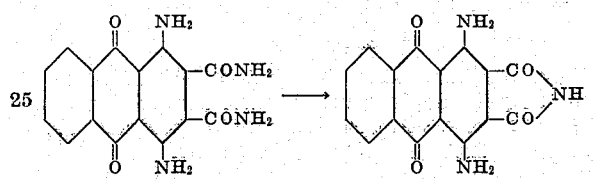

A mixture of 50 parts of 1,4-diamino-2,3-anthraquinone-dicarboxamide [see co-pending application Serial No. 260,085 (OR-2183)] and 500 parts of 96% sulfuric acid was heated for one hour at from 75° to 80° C.

The temperature was lowered to from 40° to 50° C. and 140 parts of water was added dropwise at from 40° to 50° C. over about one hour. Orange plates crystallized out of the solution. After cooling the crystals were separated by filtration and washed with 75% sulfuric acid. The crystals were stirred several minutes in boiling water and the crystals changed from orange to blue. The blue crystals were separated by filtration and washed with hot water until the filtrate contained no mineral acid as tested by Congo Red paper. After drying, a yield of 43 parts (91% of the theoretical) of 1,4-diamino-2,3-anthraquinone-dicarboximide was obtained. Nitrogen analysis showed 13.60% N (theory for $C_{16}H_9O_4N_3$ is 13.66% N). This compound was blue in color and had a melting point over 300° C. The compound dyed "Dacron'" fiber a greenish-blue color which had excellent light-fastness and gas-fume fastness. During dyeing, carriers such as benzoic acid or paraphenylphenol were beneficial in improving the affinity of the dye for the fiber.

b. From the corresponding 1,4-diamino-2,3-anthraquinone-dicarbonitrile as follows:

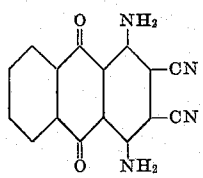

To a stirred solution of 630 parts of 98.2% sulfuric acid heated to 80° C. there was added 126 parts of dried, powdered, 1,4-diamino-2,3-anthraquinone-dicarbonitrile. An exothermic reaction occurred and the temperature rose to 140° C. The mixture was heated for one hour at 150° C. and then cooled to from 40° to 45° C. Enough water (255 parts by weight) was added at 40° to 45° C. dropwise to make a 70% acid solution. After cooling to room temperature the orange crystals were separated by filtration and washed with 70% sulfuric acid. The orange crystals were slurried with water at from 70° to 80° C. for 1½ hours with a color change from orange to blue. The blue crystals were separated by filtration and washed with hot water until the filtrate was acid-free. After drying, a 73% yield of 1,4-diamino-2,3-anthraquinone-dicarboximide was obtained. From the 70% sulfuric acid solution an additional 20% yield of less pure compound was obtained by drowning the sulfuric acid solution in 5000 parts of water and isolating the 1,4-diamino-2,3-anthraquinone-dicarboximide by filtration and washing until the filtrate was acid-free. The 1,4-diamino-2,3-anthraquinone-dicarboximide prepared by this method had 13.40% N (theory for $C_{16}H_9O_4N_3$ is 13.66% N) and was identical in dyeing behavior to the compound prepared by method (a) above.

Example 2

The compound, 1,4-diamino-N-methyl-2,3-anthraquinone-dicarboximide was prepared from 1,4-diamino-2,3-anthraquinone-dicarboximide in 91% yield by the method given below:

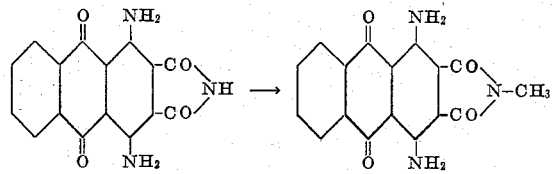

A mixture of 46.2 parts of 1,4-diamino-2,3-anthraquinone-dicarboximide, 40 parts of 21% methylamine solution in methanol, 390 parts of ortho-dichlorobenzene and 238 parts of methanol was heated with stirring in a steel autoclave for four hours at from 175° to 180° C. After cooling, the blue-bronze crystals were separated by filtration and washed with alcohol until the filtrate was almost colorless. After drying, the yield of 1,4-diamino-N-methyl-2,3-anthraquinone-dicarboximide was 44 parts (91% of the theoretical yield). The compound had 13.00% N (theory for $C_{17}H_{11}O_4N_3$ is 13.15% N), and had a melting point over 300° C. The compound dyed "Dacron" fiber a greenish-blue color which had excellent light and gas fume fastness. The affinity for this fiber was improved by using a 1:1 mixture of 1,4-diamino-2,3-anthraquinone-dicarboximide and 1,4-diamino-N-methyl-2,3-anthraquinone-dicarboximide.

Example 3

The 1,4-diamino-N-n-butyl-2,3-anthraquinone-dicarboximide was prepared by the method used in Example 2. A mixture of 15 parts of 1,4-diamino-2,3-anthraquinone-dicarboximide, 150 parts of n-butylamine, 1300 parts of ortho-dichlorobenzene and 790 parts of ethyl alcohol was heated for four hours at from 180° to 190° C. in a steel autoclave with stirring. The dye was isolated by the procedure described in Example 2. Nitrogen analysis showed 11.48% N (theory for $C_{20}H_{17}O_4N_3$ was 11.55% N), and the compound melted at from 210° to 216° C. The 1,4-diamino-N-n-butyl-2,3-anthraquinone-dicarboximide dyed "Dacron" fiber a greenish-blue color.

Example 4

1,4-diamino-N-isobutyl-2,3-anthraquinone-dicarboximide

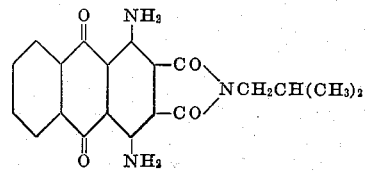

was prepared by the method of Example 2 from a mixture of 90 parts of 1,4-diamino-2,3-anthraquinone-dicarboximide, 90 parts of isobutylamine, 650 parts of ortho-dichlorobenzene and 400 parts of methanol. The mixture was heated five hours at from 170° to 175° C. and the product was isolated as illustrated in Example 2. The dye had 11.38% N (theory for $C_{20}H_{17}O_4N_3$ is 11.55% N), and dyed "Dacron" fiber a greenish-blue color which had excellent light and gas fume fastness.

Example 5

The 1,4-diamino-N-benzyl-2,3-anthraquinone-dicarboximide

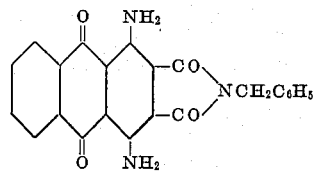

was prepared by the method described in detail in Example 2, by heating for four hours at from 165° to 170° C. a mixture of 90 parts of 1,4-diamino-2,3-anthraquinone-dicarboximide, 140 parts of benzylamine, 650 parts of ortho-dichlorobenzene and 400 parts of methanol. The resulting 1,4-diamino-N-benzyl-2,3-anthraquinone-dicarboximide melted at 290° C., had 10.27% N (theory for $C_{23}H_{15}O_4N_3$ is 10.56% N), and dyed "Dacron" fiber a greenish-blue color which had excellent light fastness.

Example 6

The 1,4-diamino-N-isopropyl-2,3-anthraquinone-dicarboximide was prepared from the dicarbonitrile as follows:

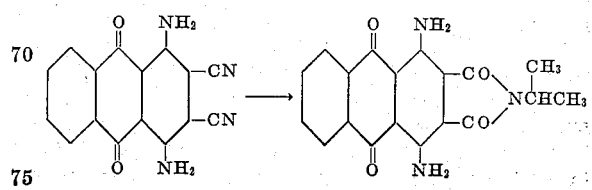

To a solution of 29 parts of 1,4-diamino-2,3-anthraquinone-dicarbonitrile dissolved in 290 parts of 96% $H_2SO_4$ there was added dropwise 13 parts of isopropyl alcohol at from 15° to 20° C. with rapid stirring. The mixture was stirred for two hours at from 20° to 25° C. and allowed to sit overnight without stirring. Enough water (107 parts) was added at 25° C. or less to make a 70% sulfuric acid solution. The crystals were separated by filtration and washed with 70% sulfuric acid. The crystals were slurried with hot water, filtered hot and washed with hot water until the filtrate was acid-free. The resultant 1,4-diamino - N - isopropyl - 2,3 - anthraquinone-dicarboximide had 12.60% N (theory for $C_{23}H_{15}O_4N_3$ is 12.00% N) and dyed "Dacron" fiber in greenish-blue shades having excellent light fastness.

*Example 7*

The 1,4 - diamino - N - sec - butyl - 2,3 - anthraquinone-dicarboximide

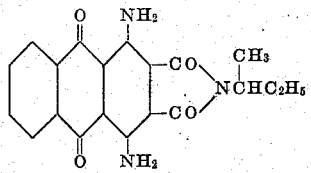

was prepared by the procedure of Example 6 from 29 parts of 1,4-diamino-2,3-anthraquinone-dicarbonitrile, 290 parts of 96% sulfuric acid and 15 parts of sec-butyl alcohol. The resultant dye colored "Dacron" fiber in bright greenish-blue shades having excellent light fastness.

*Example 8*

The 1,4 - diamino - N - (2 - hydroxyethyl) - 2,3-anthraquinone-dicarboximide

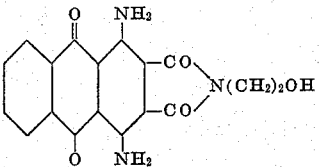

was prepared by the method of Example 2 except that nitrobenzene was substituted for ortho-dichlorobenzene as a reaction solvent. A mixture of 40 parts of 1,4-diamino-2,3-anthraquinone-dicarboximide, 30 parts of ethanolamine, 360 parts of nitrobenzene and 240 parts of methanol was heated with stirring for four hours at 190° C. in a steel autoclave. The resultant dye had a melting point of from 281° to 286° C., and had 11.70% N (theory for $C_{24}H_{13}O_5N_3$ is 11.95% N). The compound dyed "Dacron" fiber a greenish-blue color which had excellent light fastness.

*Example 9*

The 1,4-diamino-N-cyclohexyl-2,3-anthraquinone-dicarboximide

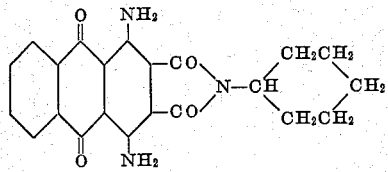

was prepared by the method of Example 2 from 9 parts of 1,4 - diamino - 2,3 - anthraquinone-dicarboximide, 13 parts of cyclohexylamine, 65 parts of ortho-dichlorobenzene and 40 parts of methanol heated for four hours at 185° C. The resultant dye had a melting point above 290° C. and had 10.44% N (theory for $C_{22}H_{19}O_4N_3$ is 10.79% N). The compound dyed "Dacron" fiber a greenish-blue color which had excellent light fastness.

*Example 10*

The 1,4 - diamino - N - n - hexyl - 2,3 - anthraquinone-dicarboximide

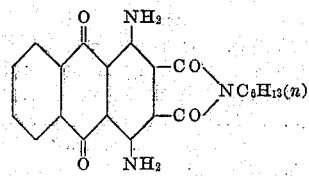

was prepared by the method of Example 2. A mixture of 10 parts of 1,4-diamino-2,3-anthraquinone-dicarboximide, 13 parts of n-hexylamine, 40 parts of methanol and 60 parts of ortho-dichlorobenzene was heated four hours at 175° C. and the product was isolated by the usual method. The compound had 11.00% N (theory for $C_{22}H_{21}O_4N_3$ is 10.75% N) and dyed "Dacron" fiber a bright greenish-blue color when benzoic acid was employed as a carrier.

*Example 11*

The 1,4-diamino-N-(3-hydroxypropyl)-2,3-anthraquinone-dicarboximide

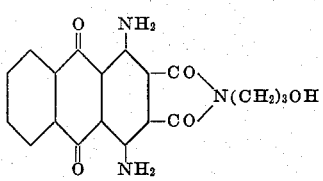

was prepared by the method of Example 2. A mixture of 10 parts of 1,4-diamino-2,3-anthraquinone-dicarboximide, 15 parts of n-propanolamine, 40 parts of methanol and 60 parts of nitrobenzene was heated for six hours at 200° C. and the product was isolated by the usual method. The compound had 12.55% N (theory for $C_{25}H_{15}O_5N_3$ is 11.50% N) and dyed "Dacron" fiber in bright greenish-blue shades.

Other 1,4-diamino-2,3-anthraquinone - dicarboximides or mixtures of such may be employed in place of those specifically used in the examples above given to more definitely illustrate the invention.

The resulting 1,4-diamino-2,3-anthraquinone-dicarboximides containing substituents in the imide nitrogen as formulated above dye the new polyester fiber, "Dacron," in blue shades having sufficiently good affinity and penetration to have commercial value when used either alone or as mixtures, and they exhibit excellent light-fastness.

It is well known in the dyeing of various fibers that the mixed compounds of a particular series often show improved strength over individual pure chemical compounds, and it has been found that mixtures of the compounds as illustrated above usually dye the new polyethylene terephthalate fiber in stronger shades than individual pure compounds themselves.

It is of course understood that mixtures may be prepared from relatively pure products; or by employing normally occurring mixtures of amines or alcohols in the preparation of these new dyes which are particularly useful in the dyeing of the new polyethylene terephthalate fiber.

We claim:
1. 1,4-diamino-2,3-anthraquinone-dicarboximides of the general formula:

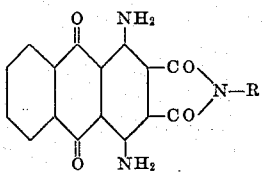

in which R stands for a radical of the group consisting of -H, -alkyl, hydroxyalkyl-, cycloalkyl- and aralkyl-, which alkyl, cycloalkyl and aralkyl groups contain not over 7 carbon atoms.

2. The 1,4-diamino-2,3-anthraquinone-dicarboximide of the formula:

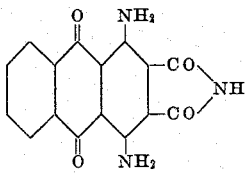

3. The 1,4-diamino-2,3-anthraquinone-dicarboximide of the formula:

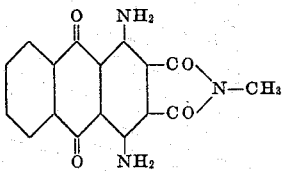

4. The 1,4-diamino-2,3-anthraquinone-dicarboximide of the formula:

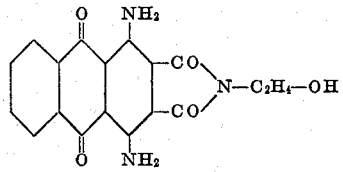

5. The 1,4-diamino-2,3-anthraquinone-dicarboximide of the formula:

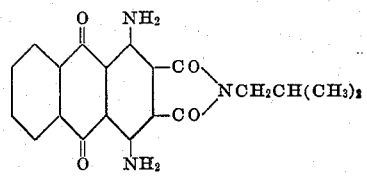

6. The 1,4-diamino-2,3-anthraquinone-dicarboximide of the formula:

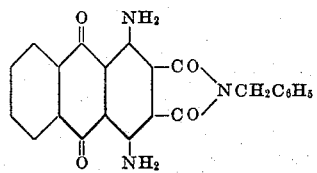

JOSEPH F. LAUCIUS.
STANLEY B. SPECK.

No references cited.